US008009356B1

(12) United States Patent
Shaner et al.

(10) Patent No.: US 8,009,356 B1
(45) Date of Patent: Aug. 30, 2011

(54) TUNABLE SURFACE PLASMON DEVICES

(75) Inventors: Eric A. Shaner, Rio Rancho, NM (US); Daniel Wasserman, Lowell, MA (US)

(73) Assignee: Sandia Corporation, Albuquerque, NM (US)

( * ) Notice: Subject to any disclaimer, the term of this patent is extended or adjusted under 35 U.S.C. 154(b) by 611 days.

(21) Appl. No.: 12/137,882

(22) Filed: Jun. 12, 2008

Related U.S. Application Data

(60) Provisional application No. 61/036,292, filed on Mar. 13, 2008.

(51) Int. Cl.
*G02B 5/18* (2006.01)
(52) U.S. Cl. .................. 359/573; 359/569; 359/288
(58) Field of Classification Search .................. None
See application file for complete search history.

(56) References Cited

U.S. PATENT DOCUMENTS

| | | | |
|---|---|---|---|
| 5,973,316 A | 10/1999 | Ebbesen et al. | |
| 6,040,936 A | 3/2000 | Kim et al. | |
| 6,982,819 B2 * | 1/2006 | Sawin et al. | 359/245 |
| 7,057,786 B2 * | 6/2006 | Sawin et al. | 359/245 |
| 7,110,154 B2 | 9/2006 | Ballato et al. | |
| 7,206,114 B2 | 4/2007 | Ballato et al. | |
| 7,701,629 B2 * | 4/2010 | Wang et al. | 359/248 |
| 7,880,251 B2 * | 2/2011 | Wang et al. | 257/431 |

OTHER PUBLICATIONS

E. A. Shaner et al, "Electrically tunable extraordinary optical transmission gratings", Applied Physics Letters, vol. 91, (2007) pp. 181110-1 through 181110-3.
D. Wasserman et al, "Midinfrared doping-tunable extraordinary transmission from sub-wavelength Gratings", Applied Physics Letters, vol. 90, (2007) pp. 191102-1 through 191102-3.
C. Janke, et al, "All-Optical switching of the transmission of electromagnetic radiation through subwavelength apertures", Optical Society of America, vol. 30, No. 18, 2005, pp. 2357-2359.

* cited by examiner

*Primary Examiner* — Arnel C Lavarias
(74) *Attorney, Agent, or Firm* — Carol I Ashby

(57) ABSTRACT

A tunable extraordinary optical transmission (EOT) device wherein the tunability derives from controlled variation of the dielectric constant of a semiconducting material (semiconductor) in evanescent-field contact with a metallic array of sub-wavelength apertures. The surface plasmon resonance wavelength can be changed by changing the dielectric constant of the dielectric material. In embodiments of this invention, the dielectric material is a semiconducting material. The dielectric constant of the semiconducting material in the metal/semiconductor interfacial region is controllably adjusted by adjusting one or more of the semiconductor plasma frequency, the concentration and effective mass of free carriers, and the background high-frequency dielectric constant in the interfacial region. Thermal heating and/or voltage-gated carrier-concentration changes may be used to variably adjust the value of the semiconductor dielectric constant.

17 Claims, 17 Drawing Sheets

TUNABLE SURFACE PLASMON DEVICES

This patent application claims priority benefit from U.S. provisional patent application Ser. No. 61/036,292, filed on Mar. 13, 2008, which is incorporated herein by reference.

The United States Government has rights in this invention pursuant to Department of Energy Contract No. DE-AC04-94AL85000 with Sandia Corporation.

BACKGROUND OF THE INVENTION

This invention relates to extraordinary optical transmission EOT devices.

Ebbesen et al. (T. W. Ebbesen, H. F. Ghaemi, T. Thio, and P. A. Wolff, "Sub-Wavelength Aperture Arrays with Enhanced Light Transmission", U.S. Pat. No. 5,973,316) reports a metallic film having apertures located therein in an array arranged in a pattern so that when light is incident on the apertures, surface plasmons on the metallic film are perturbed, resulting in an enhanced transmission of the light emitted from individual apertures in the array. The aperture array is used: to filter light of predetermined wavelength traversing the apertures, to collect light over a distance after traversing the apertures, to improve operation of near-field scanning optical microscopes, and to enhance light transmission through masks usable in photolithography.

BRIEF DESCRIPTION OF THE DRAWINGS

The accompanying drawings, which are incorporated in and form part of the specification, illustrate some embodiments of the present invention and, together with the description, serve to explain the principles of the invention.

DETAILED DESCRIPTION OF THE INVENTION

Figure 1A:
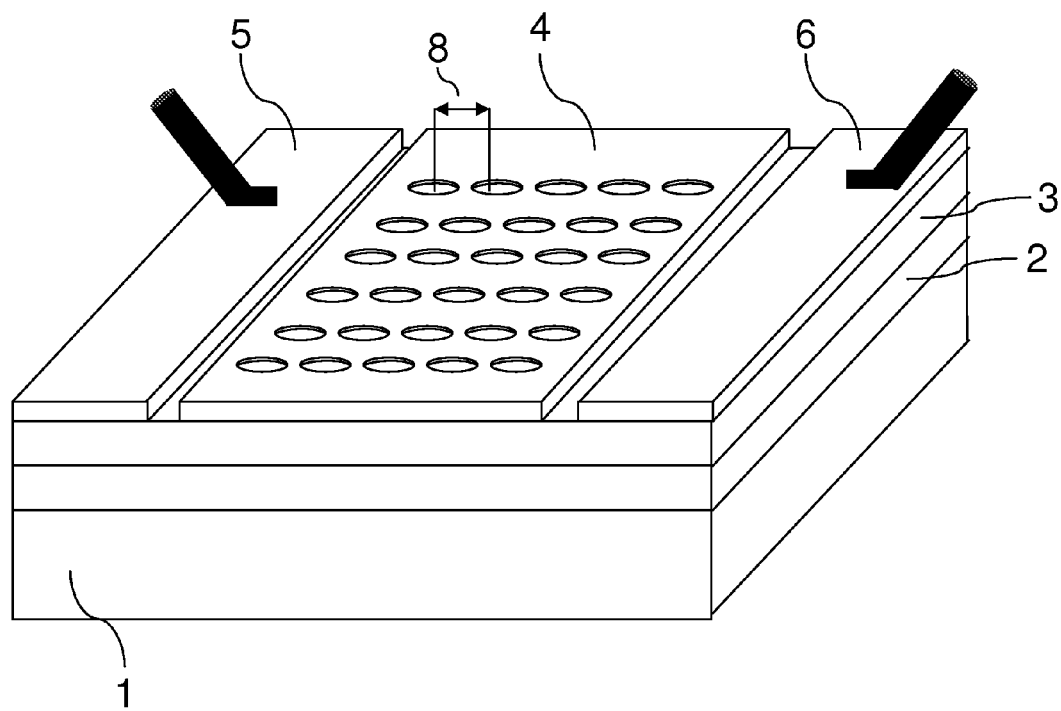
FIG. 1 illustrates a thermally tuned extraordinary optical transmission (EOT) grating device. The number of apertures in the illustration is not intended to be representative of the total number of apertures in the grating device. a) A representative embodiment comprising a GaAs/AlGaAs heterostructure. b) A cross-section of a representative embodiment comprising a spacer layer between the EOT grating and the semiconductor.

This invention comprises tunable extraordinary optical transmission (EOT) devices wherein the tunability derives from controlled variation of the dielectric constant of a semiconducting material (semiconductor) in evanescent-field contact with a metallic array of sub-wavelength apertures. Optical passbands in surface plasmon (SP) EOT devices are determined to first order by two factors. One is the periodicity of arrays of holes with apertures with cross-sectional dimensions less than the wavelength of light to be transmitted. The wavelengths of the passbands are related to the surface plasmon excitations at the metal/air and metal/dielectric interfaces. The metallic array of sub-wavelength apertures is termed an extraordinary optical transmission (EOT) grating. The second factor is the metal/dielectric SP mode frequency for an aperture array of a given periodicity, which is determined primarily by the combined dielectric properties of the metal and the dielectric material serving as substrate for the EOT grating. The SP resonance wavelength can be changed by changing the dielectric constant of the dielectric material and/or the metal. In embodiments of this invention, the dielectric material is a semiconducting material or other suitable material having a temperature-dependent refractive index. The dielectric constant of the semiconducting material in the metal/semiconductor interfacial region is controllably adjusted by adjusting one or more of the semiconductor plasma frequency, the concentration and effective mass of free carriers, and the background high-frequency dielectric constant in the interfacial region. Thermal heating and/or voltage-gated carrier-concentration changes may be used to cause the changes in dielectric constant. We use the term interfacial to mean within the evanescent-field or near-field distance of the surface plasmon from the metal surface.

The wavelength tunability of an EOT grating device comprising n-doped GaAs by varying the doping of a GaAs epilayer underlying a periodic two-dimensional metallic EOT grating has been described by the inventors in their journal article, D. Wasserman, E. A. Shaner, and J. G. Cederberg, "Midinfrared doping-tunable extraordinary transmission from sub-wavelength Gratings," Appl. Phys. Lett. Vol. 90 (2007) pp. 191102-1 to 191102-3, which is incorporated herein by reference. The inventors have described a semiconductor-based mechanism for electrically controlling the frequency of light transmitted through extraordinary optical transmission gratings in their journal article E. A. Shaner, J. G. Cederberg, and D. Wasserman, "Electrically tunable extraordinary optical transmission gratings," Appl. Phys. Lett. Vol. 91 (2007) pp. 181110-1 to 181110-3, which is incorporated herein by reference.

In various embodiments, the free-carrier concentration can be controlled by selection of a semiconductor substrate carrier concentration, by growth of a doped epitaxial layer of semiconductor on a semiconductor substrate, by heating, and by applying an electrical potential to the metallic array whereby the metallic array serves as an electrical gate contact to change the concentration of free carriers in the semiconductor region adjacent to the gate (the EOT grating). A voltage applied to the gate contact can serve to cause depletion or accumulation of carriers in the region adjacent to the EOT grating; thermal effects due to resistive heating resulting from current flow may or may not be important factors in gating-based embodiments.

For purposes of this invention, the term surface plasmon (SP) is also used for a surface plasmon polariton (SPP).

Light transmission through an EOT structure relies on SP excitation at the air/metal and dielectric/metal interfaces. An approximate expression for the normal-incidence SP resonance condition, based on the SP dispersion of a smooth metal film, is given by $$\sqrt{i^2 + j^2}\,\lambda = a_0 Re\left(\sqrt{\frac{\varepsilon_s \varepsilon_m}{\varepsilon_s + \varepsilon_m}}\right) \approx a_0 \sqrt{\varepsilon_s} \text{ for } |\varepsilon_m| >> |\varepsilon_s|, \quad (1)$$

where $\lambda$ is the free space wavelength, $a_0$ is the lattice constant (the spacing between adjacent aperture centers), i and j are integers related to the reciprocal lattice vectors $2\pi/a_0$ x and $2\pi/a_0$ y, respectively, and $\in_s$ and $\in_m$ are the complex permittivities of the dielectric material and metal, respectively. The spectral position of the transmission peak (light transmission wavelength) related to the metal/dielectric SP can be tuned by varying $a_0$ or $\in_s$. In embodiments of this invention, one or both of the lattice constant and the dielectric constant are controllably changed to change the resonance wavelength of the device.

Figure 1B:
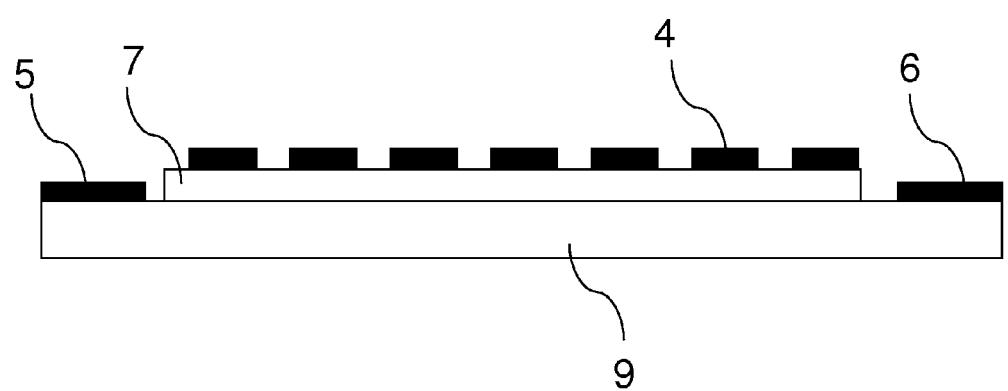

In some embodiments, the dielectric constant of a semiconducting material is controllably adjusted by resistive heating of the semiconductor in interfacial contact with the metal layer. A diagram illustrating one embodiment of this type is presented in FIG. 1a for a device made using GaAs and AlGaAs as the semiconducting materials. The following device was designed for operation at wavelengths around 8 micrometers (1250 cm$^{-1}$). For the purpose of current confinement, an AlGaAs 2 layer (50 nm of undoped $Al_{0.2}Ga_{0.8}As$) was grown on a buffer layer of undoped GaAs on semi-insulating GaAs 1. On this substrate, a layer of n-type GaAs 3 (100 nm of n=3.5×10$^{18}$/cm$^3$) was grown. Other doping levels, layer thicknesses, and Al mole fractions may be used if the combination results in the current being sufficiently confined to the n-type GaAs layer to produce the desired change in temperature in the interfacial region. An EOT grating 4, a source contact 5, and a drain contact 6 were formed on the surface of the n-GaAs layer 3. In this embodiment, the EOT grating 4 comprises a patterned metal film layer. FIG. 1b show such an embodiment in cross section, where the semiconductor layer 9 comprises a variety of semiconductor structural combinations such as, for example, the heterostructure comprising 1, 2, and 3 in FIG. 1a; a structure comprising only one type of semiconductor but with a doped current carrying region proximate to the grating and a semi-insulating or insulating layer underlying the doped region; a semiconductor substrate of substantially uniform doping level that is suitable for conducting current between the source 5 and drain 6 contacts such that resistive heating of the region proximate to the grating can change the dielectric constant and thereby tune the SP resonance frequency. In FIG. 1b, an optional spacer layer 7 between the EOT grating and the semiconductor is shown. The spacer layer can be an electrical insulator suitable for gating free carriers or a material having a temperature-dependent refractive index for temperature-tuned embodiments. The spacer layer can be sufficiently thin that the dielectric constant within the evanescent-field distance is predominantly determined by the semiconductor layer's properties, or it may be thicker so that the evanescent-field distance is predominantly within the spacer layer so that the dielectric constant of the spacer layer and the temperature dependence of the spacer dielectric constant predominantly determine the SP resonance frequency. For other embodiments of this invention where a spacer layer is employed, the thickness and composition of the spacer layer may be selected to either make its dielectric constant dominate the SP resonance condition or have a relatively small effect on the SP resonance condition. For embodiments using doped GaAs, undoped or differently doped AlGaAs may serve well as a spacer material. In various embodiments of the invention, substantial transmission of the SP frequency through the substrate and/or substrate/spacer combinations are desired. For operation in the visible region, substantially transparent materials such as, for example, GaN can be used. For some embodiments, a substantially transparent organic material with suitable electrical properties may be used, such as, for example, the polymer SU8.

For operation of the device as an EOT filter operating near 8 micrometers, the periodicity 8 (hole center-to-hole center separation) was 2.4 micrometer. Equation 1 may be used to approximately calculate the periodicity for a particular wavelength using a particular set of materials. The aperture diameter was approximately 1.25 micrometers. Other periods and aperture diameters may be employed when operation of the filter at a different wavelength is desired. While this embodiment demonstrates operation in the mid-IR region of the light spectrum, operation in other frequency ranges is also possible with proper selection of grating periodicity and substrate materials. For example, operation in the visible, near-IR, and THz regions is possible using thermal tuning of the dielectric constant. The source and drain contacts were Ohmic contacts formed by evaporation and annealing (235 Å Ge/470 Å Au/300 Å Ni/1000 Å Au in this embodiment, but alternative Ohmic contact metallizations for GaAs may be used). The Ohmic contact metallization is selected based on the particular semiconductor being employed in the device, as is known to those of skill in fabricating semiconductor devices. The square lattice grating designed for transmission at 8 micrometer was made of 10 nm/50 nm Ti/Au and defined using optical photolithography and a lift-off metallization process. Other metallizations and other metallization patterning techniques may also be employed. While this is not an optimum metallization for mid-IR surface plasmons, Ti/Au meshes (gratings) do exhibit EOT phenomena and this metallization was used due to ready availability in the inventor's lab. Other grating metallizations may also be employed, including but not restricted to Au, Cu, Al, Pt, Ag, Pd, Ti, W, Mo, Ni, In, Cr, alloys thereof, and metallizations comprising one or more layers of distinct elemental or alloy composition. The device was electrically isolated on-chip by a mesa etch through the doped n-GaAs layer. Current flows between the source and drain contacts and passes under the EOT grating. When the current is passing under the grating, the epilayer in interfacial contact with the EOT grating metal is resistively heated. This changes both the periodic spacing, $a_0$, and the semiconductor dielectric constant, $\in_s$, to varying degrees and shifts the SP resonance wavelength.

The preceding embodiment was made using the GaAs/AlGaAs semiconductor system. Other embodiments may use different semiconductors. Selection of the semiconductor for a particular embodiment is based on several criteria. The substrate should be transparent or at least partially transparent at the SP resonance frequency. For a semitransparent substrate, the degree of transparency may be increased by thinning the substrate from the back side as part of the device fabrication. For the purposes of this invention, unless otherwise stated, we use the term transparent to also include a partially transparent state. For some wavelengths, free-carrier absorption may reduce the transparency of the device. Free-carrier effects can be minimized or avoided by using insulating, semi-insulating, or lightly doped semiconductor substrates. A wide variety of semiconductor systems may be used as long as adequate transparency is provided. These include but are not restricted to Si, Ge, InSb, InAs, InP, GaN, GaP, GaAs, GaSb, CdSe, CdTe, ZnO, and ZnS. Appropriate grating periodicity may be determined for a desired wavelength with a particular semiconductor using Eqn. 1. A range of aperture sizes may be used; one useful lateral dimension is approximately half the grating period, but other ratios may be employed. In the illustrated embodiments, we have represented approximately circular apertures, but other aperture geometries may also be used. Other array geometries, such as, for examples a hexagonal lattice, which are suitable for surface plasmon excitation can also be used.

Figure 2:
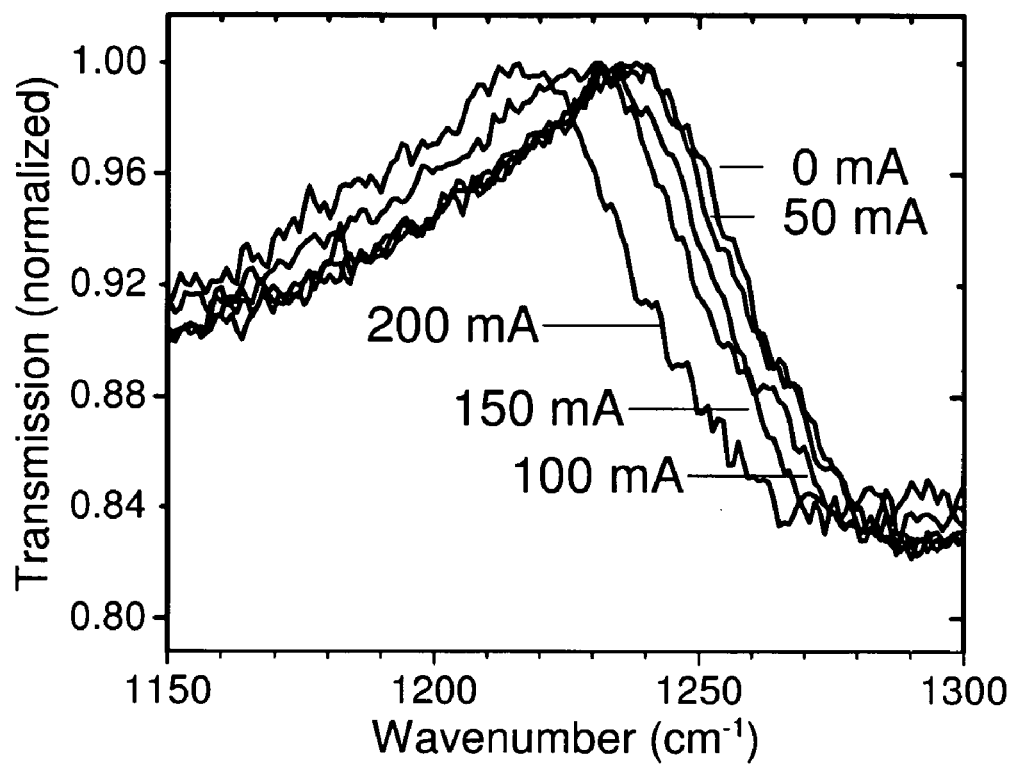
FIG. 2 illustrates the current dependence of the surface plasmon resonance frequency of one embodiment of a thermally tuned EOT device.

FIG. 2 illustrates the normalized transmission spectra for the 8-micrometer (1250 cm$^{-1}$) tunable surface plasmon device as a function of source-drain current. The results presented in FIG. 2 were obtained when current was applied between the source and drain contacts using a dc power supply operating in a constant current mode. The relatively large background signal in FIG. 2 is largely due to the light transmission through the non-metallized areas along the perimeter of the Ohmic contacts and the grating (mesh) in the demonstration device. Suitable packaging and sizing of the device can minimize such background. A redshift can be seen as the current is increased from 0 to 200 mA (0 to 1.86 W power dissipated). The shift in GaAs band-edge photoluminescence with current shows a calculated temperature variation from 300 K at 0 ma to over 550 K at 200 mA, as calculated by the band gap $\in_G(T)=1.519-5.405\times10^{-4}T^2/(T+204)$ where T is the temperature in Kelvin.

The maximum shift illustrated is approximately 25 cm$^{-1}$. The strength of the transmission peak does not decrease substantially (approximately 25% reduction) at the highest current in FIG. 2. Additionally there are no significant increases in the peak linewidth as a function of current. These characteristics suggest that scattering and free carrier losses do not significantly affect device performance at higher temperatures.

Thermal expansion can change $a_0$, which would lead to a redshift in the SP transmission peak. This would be expected to be an effect on the order of 2 cm$^{-1}$ at the higher current value of approximately 200 mA. There are several competing temperature-dependent dielectric shifts possible in the semiconductor material. These include thermal generation of free carriers and the temperature dependence of the dielectric constant. In the relatively thin doped GaAs layer, which contains a high density of free carriers due to the grown-in dopant concentration, additional effects such as the reduction of the semiconductor plasmon damping time and the free carrier effective mass may also be considered. The temperature dependence of the semiconductor dielectric function can be modeled using the Drude approximation, including scattering, as:

$$\varepsilon(\omega, T, n) = \varepsilon_b(T)\left(1 - \frac{\omega_p(T, n)^2}{\omega^2 + i\omega\gamma(T, n)}\right), \quad (2)$$

$$\omega_p(T, n)^2 = \frac{4\pi n(T)e^2}{\varepsilon_b(T)m^*(T, n)}$$

Here, $\omega_p(T, n)$ is the plasma frequency, $\gamma(T, n)$ is the plasmon damping term ($=1/\tau$ where $\tau$ is the scattering time), n(T) is the carrier concentration, e is the charge of an electron, $\in_b(T)$ is the background high frequency dielectric constant of the semiconductor, and m*(T, n) is the effective electron mass in the semiconductor. The modeled shift is greatest for the undoped GaAs buffer and substrate, and is explained by the temperature dependence of the GaAs dielectric constant:

$$\in_b(T) = 10.6(1 + T \cdot 9 \times 10^{-5}) \quad (3)$$

Thermal generation of carriers can create bulk densities on the order of $1 \times 10^{13}$ cm$^{-3}$ in GaAs at the demonstrated temperatures, which is too low to provide a significant shifting of the SP peak by increased carrier density effects alone. The additional temperature dependent terms in Eqn. 2 more strongly affect the peak position expected at higher temperatures for doped material in this temperature range. As the doping of the semiconductor is increased, the redshift of the transmission peak is somewhat offset by the Drude contribution to the dielectric function.

For improved optical output quality when utilizing these tunable plasmonic devices as active optical components, the effect of losses on the transmission intensity and the linewidth of the transmission peak can be addressed. In the embodiment described above, a decrease in transmission peak strength of approximately 25% is seen as the device temperature is increased. This is may be due to increased losses in both the 500 μm GaAs substrate and at the interface between the metal mesh and the highly doped GaAs epilayer. Burying the doped GaAs layer under an undoped surface layer would decrease the overlap of the SP field with the free carriers of the doped layer, thereby decreasing the contribution of changes in the dielectric constant due to changes in free-carrier concentration, while still allowing for resistive heating of the sample. For some embodiments intended to operate in the mid-IR, a spacing of approximately 2 microns is useful. In some embodiments, the heater and spacer layers can be relatively thin (a few hundred nanometers) and highly doped. Substrate losses can be minimized by making thinner devices which, at the same time, will reduce the thermal mass and electrical power requirements. Finally, the linewidth and shape of the transmission peak can also be significantly improved by optical techniques such as utilizing crossed polarizers. Such an experiment has been performed on large area SP gratings and produced linewidths of less than 10 cm$^{-1}$ for EOT gratings designed for transmission at 9 micrometers (1111 cm$^{-1}$) with periodicity of approximately 2.7 micrometers and aperture diameter of approximately 1.35 micrometers.

Figure 3:
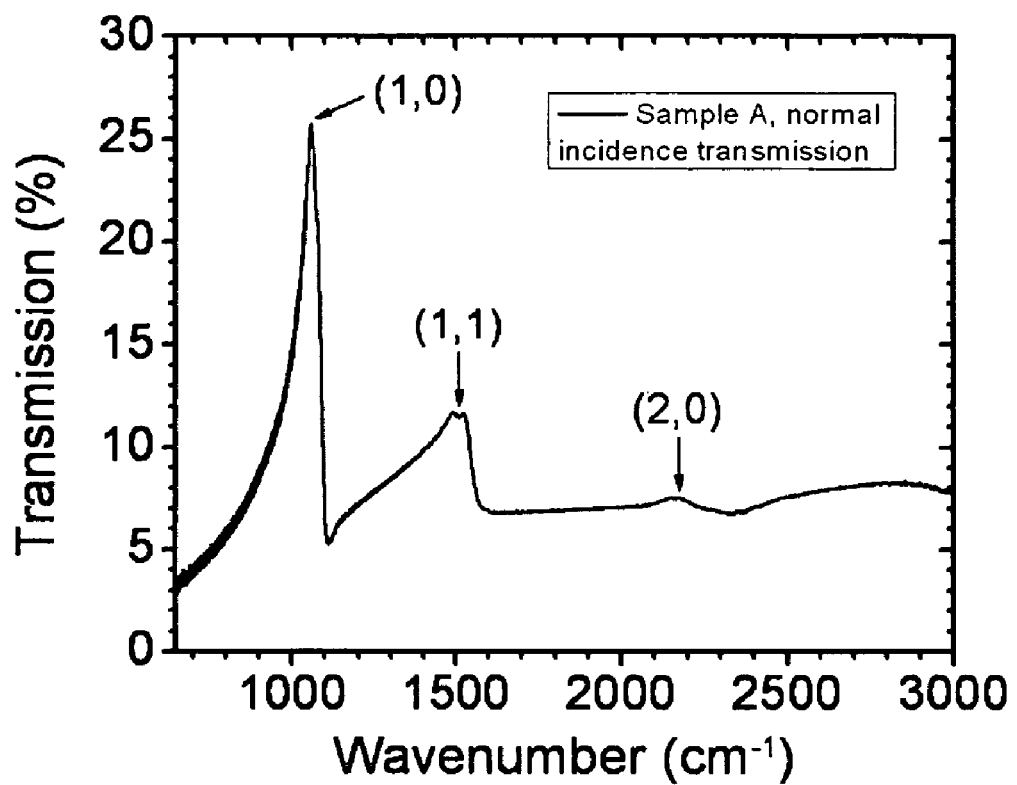
FIG. 3 illustrates the transmission spectrum of a Ti/Au metal EOT grating deposited upon a lightly doped ($2.1\times10^{16}$ cm$^{-3}$) 500-nm GaAs epilayer showing three SP resonance modes designated (1,0), (1,1), and (2,0).

FIG. 3 illustrates the transmission spectrum of a Ti/Au metal EOT grating deposited upon a lightly doped ($2.1 \times 10^{16}$ cm$^{-3}$) 500-nm GaAs epilayer. Three SP resonances are noted in the figures as (1,0), (1,1), and (2,0). For the lightly doped epilayer sample, transmission of over 25% is shown, corresponding to 113% transmission, when normalized to the open area (uncovered by metal) of the sample. The spectral linewidth for the (1,0) mode is quite narrow, with the linewidths for higher modes becoming wider and transmitted intensities lower than for the (1,0) mode. The relatively high background between resonances is attributable to the relatively thin metallization, which allows some background light transmission in this wavelength range.

Figure 4:
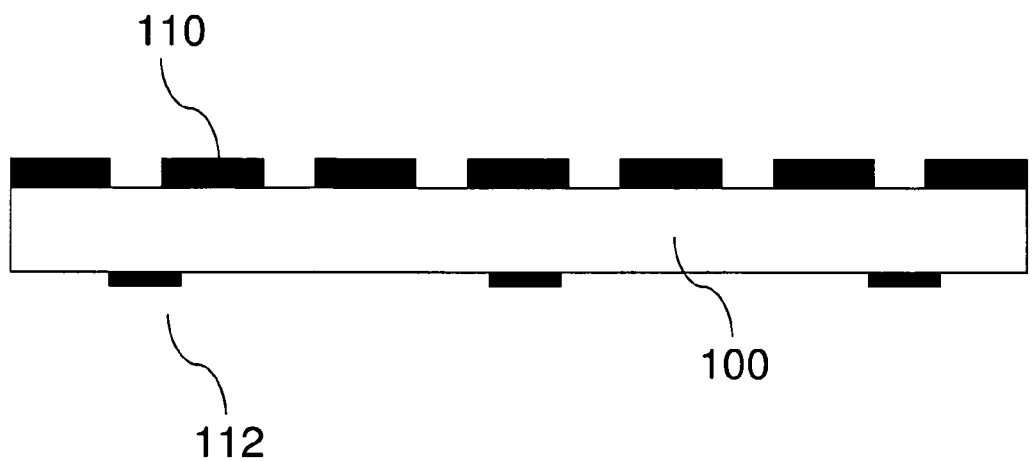
FIG. 4 illustrates a cross section of an embodiment wherein the current that produces resistive heating to tune the SP resonance frequency passes vertically through the device.
Figure 5:
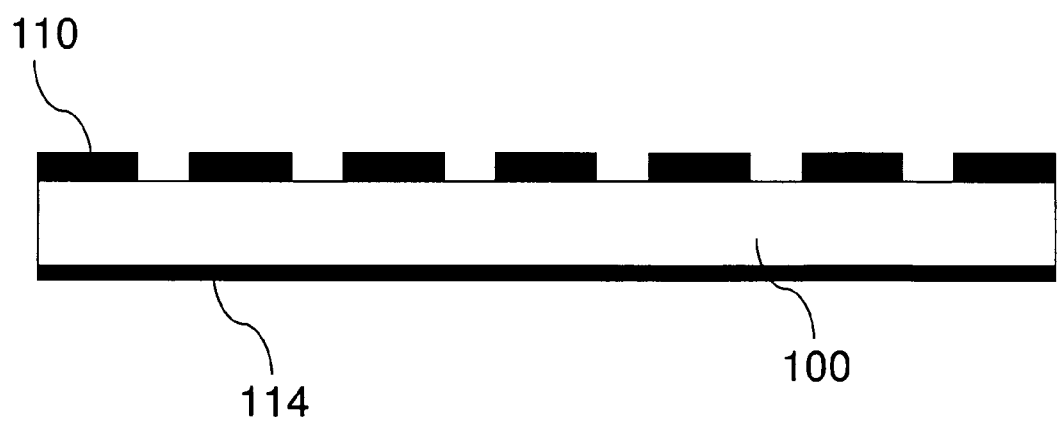
FIG. 5 illustrates a cross section of another embodiment wherein the current that produces resistive heating to tune the SP resonance frequency passes vertically through the device.

FIGS. 4 and 5 illustrate embodiments wherein the current that produced resistive heating to tune the SP resonance frequency passes vertically through the device rather than parallel to the surface, as in embodiments such as those represented in FIG. 1. In FIG. 4, an EOT grating 110 is formed on the top surface of a substrate 100. This is serves as the source (drain) contact. On the back surface of the substrate 100, a set of contact lines or a contact mesh 112 is formed as the drain (source) contact. Current can be passed between the source and drain contacts to resistively heat the semiconductor material within an evanescent-field distance from the EOT grating, thereby temperature-tuning the SP resonance frequency. The substrate 100 can comprise a wide variety of semiconductor structural combinations such as, for example, a heterostructure; a structure comprising only one type of semiconductor but with layers of different doping concentrations, and a semiconductor substrate of substantially uniform doping level that is suitable for conducting current between the source and drain contacts such that resistive heating of the region proximate to the grating can change the dielectric constant and thereby tune the SP resonance frequency. In FIG. 5, the contact lines or mesh 112 are replaced with a transparent or semi-transparent electrode 114.

Figure 6:
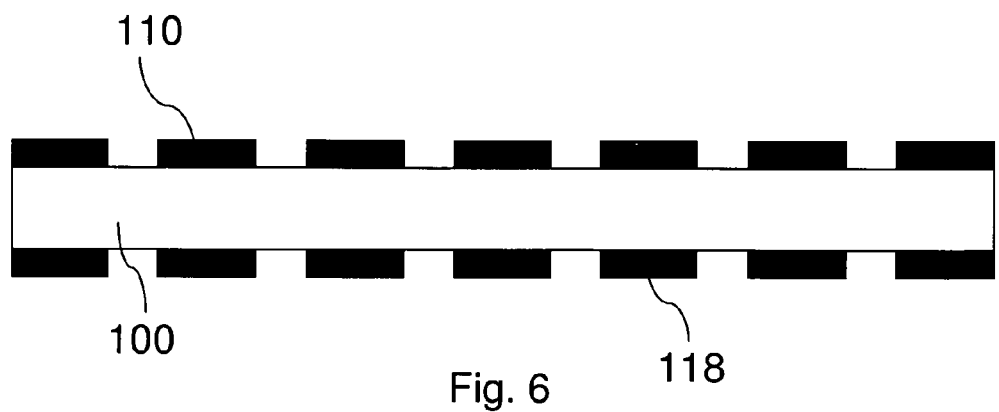
FIG. 6 illustrates a cross section of an embodiment of a thermally tuned device wherein the EOT gratings also serve as the source and drain contacts for the resistive heating current.
Figure 7:
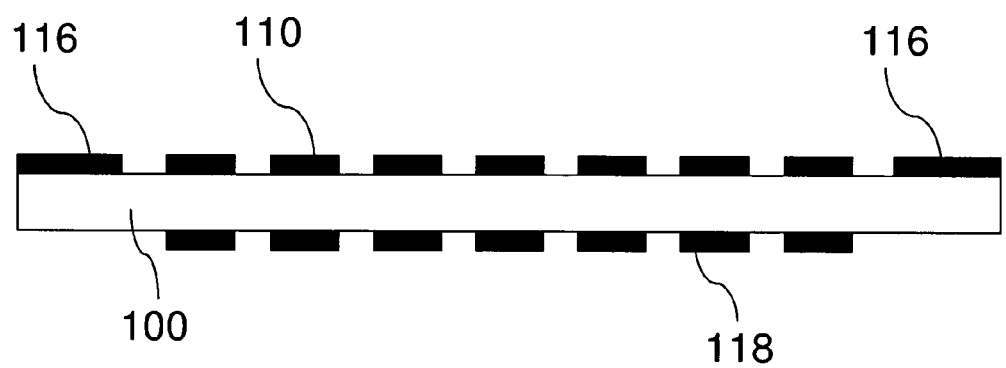
FIG. 7 illustrates a cross section of an embodiment of a thermally tuned device wherein Ohmic contacts are formed on the surface of the substrate where the near-surface region is suitably doped for resistive heating by parallel passage of current between the contacts.
Figure 8:
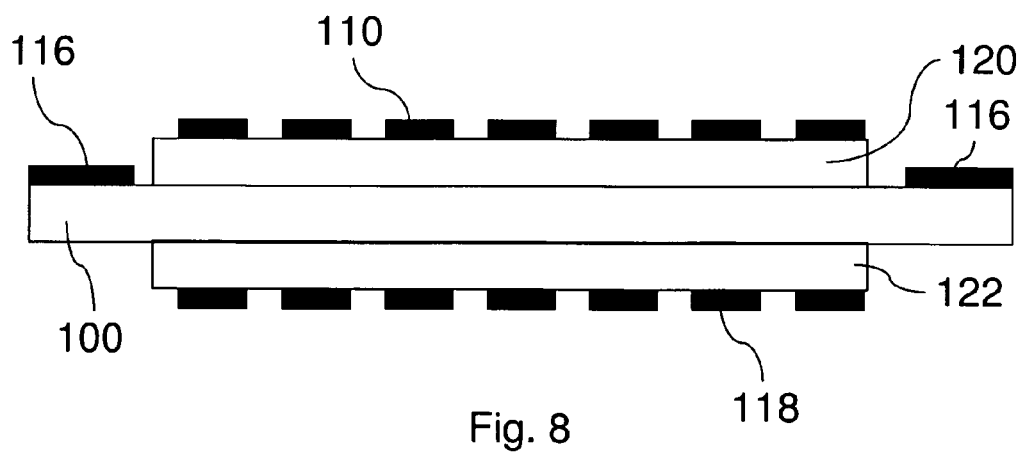
FIG. 8 illustrates a cross section of an embodiment of a thermally tuned device wherein Ohmic contacts are formed on the surface of the substrate and optional spacer layers are located between the substrate and the EOT gratings.

FIGS. 6, 7, and 8 illustrate embodiments wherein EOT gratings 110 and 118 are formed on both top and bottom surfaces of the substrate 100 with approximately aligned apertures. In FIG. 6, the EOT gratings also serve as the source and drain contacts for the resistive heating current. In FIG. 7, Ohmic contacts 116 are formed on the surface of the substrate where the near-surface region is suitably doped for resistive heating by parallel passage of current between the contacts 116. In FIG. 8, one or two optional spacer layers 120 and 122 are situated between one or both the EOT gratings 110 and 118 and the substrate 100. The spacer layers can be sufficiently thin that the dielectric constant within the evanescent-field distance is predominantly determined by the semiconductor layer's properties, or it may be thicker so that the evanescent-field distance is predominantly within the spacer layer so that the dielectric constant of the spacer layer and the temperature dependence of the spacer dielectric constant predominantly determine the SP resonance frequency. For other embodiments of this invention where a spacer layer is employed, the thickness and composition of the spacer layer may be selected to either make its dielectric constant dominate the SP resonance condition or have a relatively small effect on the SP resonance condition. The spacer layer may be a semiconductor material or some other material having a temperature-dependent refractive index. Such devices can work as modulators when meshes are tuned, either by design or through dielectric tuning, to difference resonant transmission bands. For example, if the dielectrics adjacent to the top and bottom meshes display different changes in refractive index with temperature change, the two meshes can initially designed to be out of resonance and can be brought into resonance only within a specific temperature range.

FIGS. 9, 10, 11, and 12 illustrate embodiments wherein the EOT grating 110 is sandwiched between two semiconductor substrates 100 and 102 which can be the same or can comprise different semiconductor materials or different doping levels. One or two spacer layers 124 and 126 can optionally be situated between the EOT grating 110 and the substrates 100 and 102. In the embodiment illustrated in FIG. 9, when the material properties of the spacer layer permit the passage of current, the EOT grating 116 can serve as either a source or drain contact with the corresponding Ohmic contacts being situated on the opposite surface of the two substrates (contacts 130 for substrate 100 and contacts 132 for substrate 102). An alternative mode of operation for use when the optional spacer layer is substantially nonconductive or when parallel rather than vertical heating is desired, the current can be passed between the two contacts labeled 130 or between the two contacts labeled 132, as in the parallel current operation mode of the embodiment illustrated in FIGS. 1a and 1b.

Figure 9:
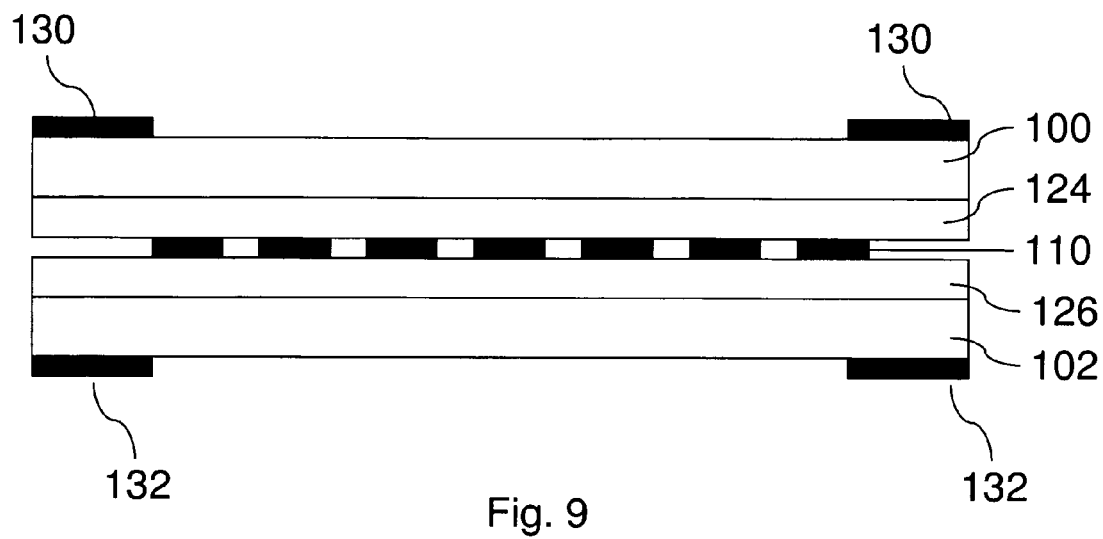
FIG. 9 illustrates an embodiment of a device wherein the EOT grating is sandwiched between two semiconductor substrates.
Figure 10:
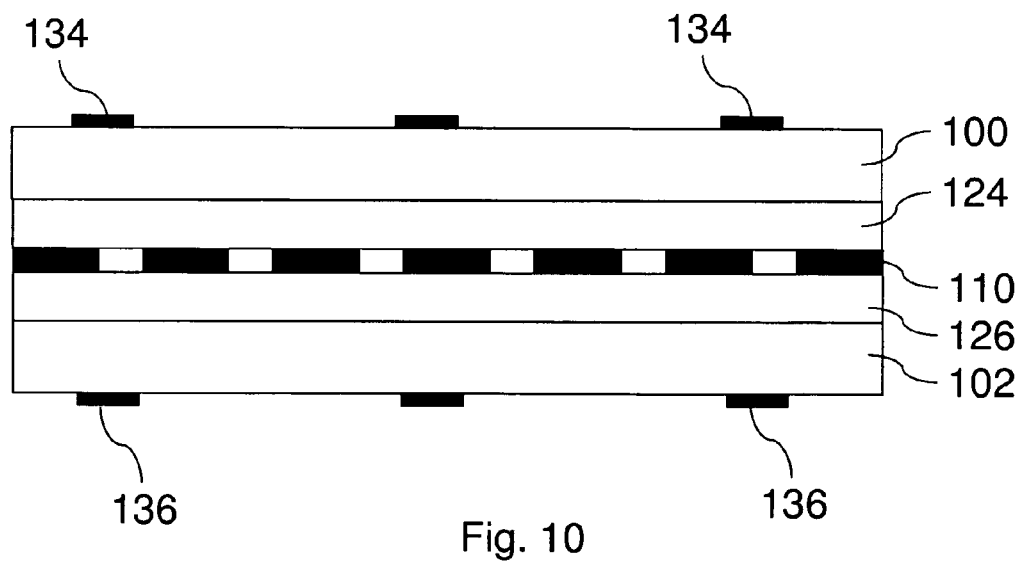
FIG. 10 illustrates a cross section of another embodiment wherein the EOT grating is sandwiched between two semiconductor substrates.
Figure 11:
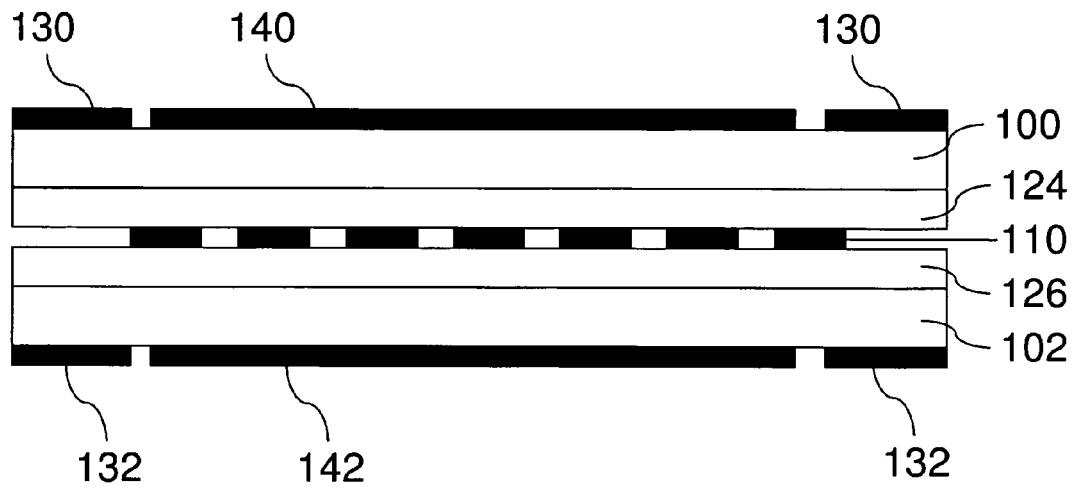
FIG. 11 illustrates a cross section of another embodiment wherein the EOT grating is sandwiched between two semiconductor substrates.

FIG. 10 illustrates an embodiment where the contacts 130 and 132 of FIG. 9 that do not substantially align with the EOT grating in the vertical direction are replaced by metal meshes 134 and 136. FIG. 11 illustrates an embodiment where a transparent or semi-transparent electrode (140 or 142) in vertical alignment with the EOT grating 110. Optionally, additional Ohmic contacts 130 or 132 may be included in the embodiment to provide options for resistive heating methods.

Figure 12:
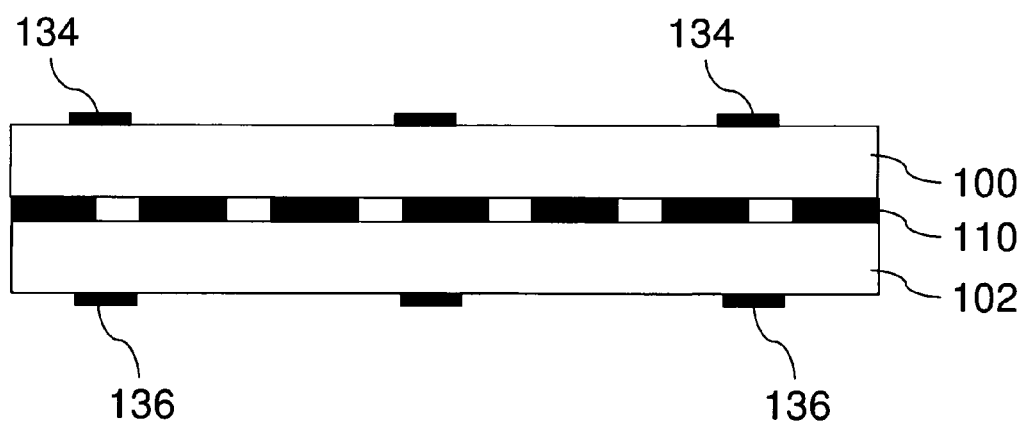
FIG. 12 illustrates a cross section of another embodiment wherein the EOT grating is sandwiched between two semiconductor substrates.

FIG. 12 illustrates an embodiment wherein current for resistive heating may be passed vertically between the EOT grating 110 and Ohmic contact meshes 134 and/or 136 or vertically between meshes 134 and 136.

FIGS. 9-12 present embodiments with contact configurations that are approximately the same on both sides of the structure. Additional embodiments can employ different contact configurations, such as combinations of those in FIGS. 9-12, on the two sides of the substrates 100 and 102.

For many embodiments, passing current through the EOT grating may also be used as the means of thermal tuning.

Figure 13A:
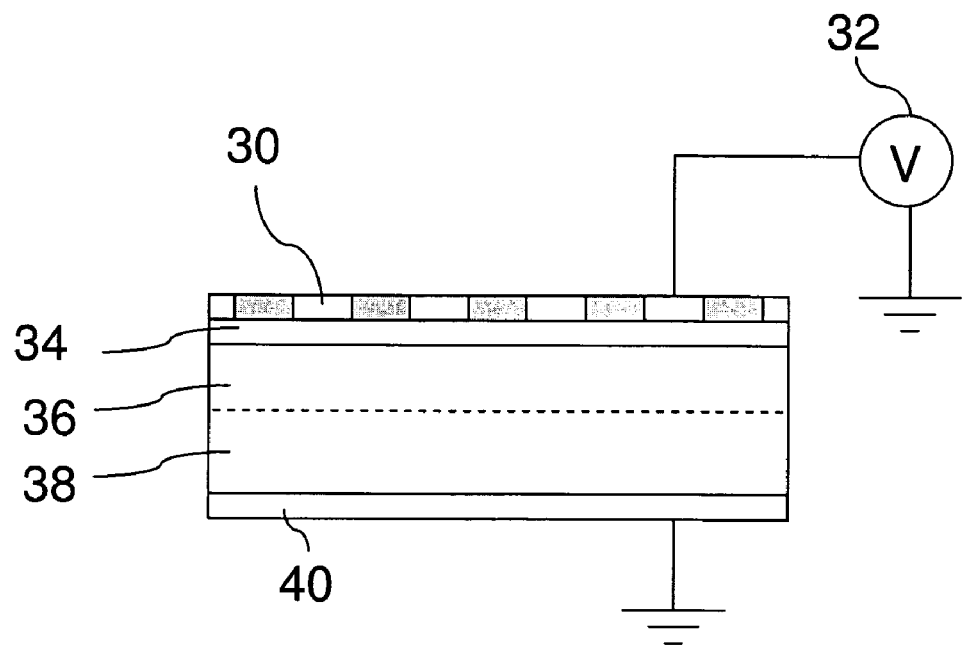
FIG. 13 illustrates cross sections of two embodiments of gating-tuned EOT grating devices based on a MIS-capacitor-like design. The number of apertures in the illustration is not intended to be representative of the total number of apertures in the grating device. a) Embodiment with transparent or semitransparent ground electrode. b) Embodiment with mesh or metal line segments comprising the ground electrode.
Figure 13B:
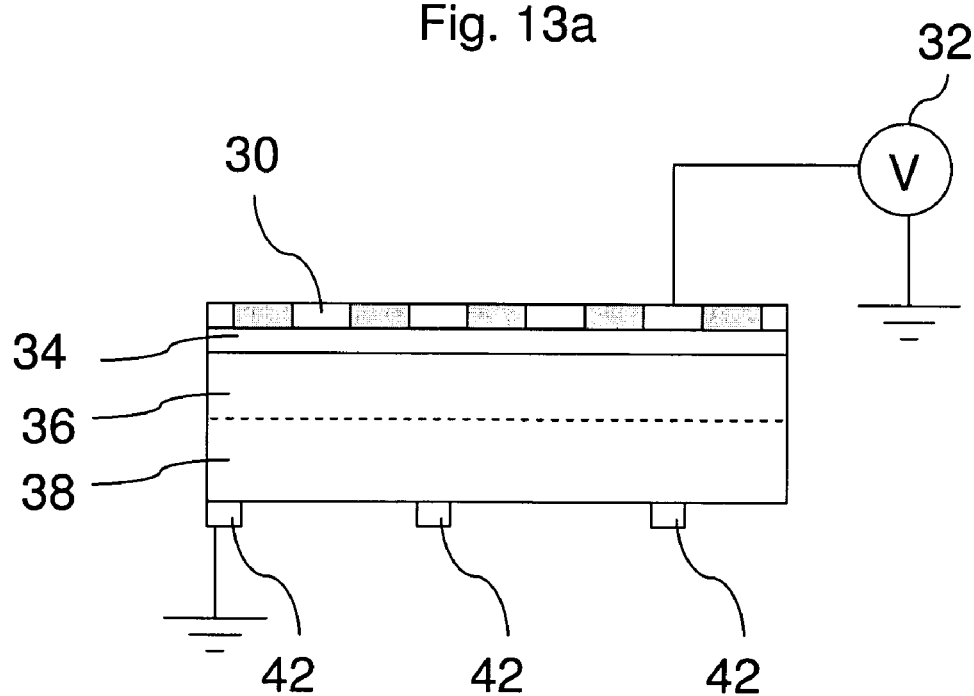

Other embodiments can use primarily a change in the semiconductor dielectric constant due to changes in free-carrier concentrations that are voltage-induced. An illustration of two such embodiments that operate as depletion mode devices are provided in FIGS. 13a and 13b; the devices are similar to an MIS (metal-insulator-semiconductor) capacitor and may be made of many types of semiconductor materials provided the degree of transparency at the resonance wavelength and the dielectric constant of the material are suitable. The EOT grating 30 serves as a gate contact to which a voltage 32 is applied to deplete the region under the gate of free carriers. For the embodiments in FIGS. 13a and 13b, the grating 30 (gate) is fabricated on a thin insulator 34 (for example, an oxide) whose thickness is sufficiently thin that the dielectric constant within the evanescent wave penetration depth (evanescent-field distance) is largely determined by the free-carrier concentration in the semiconductor region that is to be depleted 36. The substrate 38 is selected to be transparent or at least sufficiently transparent at the SP resonance wavelength as to pass most of the emitted resonant light. The semiconductor may comprise a suitably doped substrate or a suitably doped epitaxial layer grown on a substrate. In one embodiment, a transparent or semitransparent common contact 40 is applied to the backside of the substrate; the material and thickness of the contact is selected so as to permit transmission of most of the resonant light (FIG. 13a). The required effective degree of transparency of the common contact may be achieved by using a conductor that is transparent or semi-transparent at the transmission frequency or by applying a sufficiently thin layer of metal to provide the required electrical connection while being semitransparent, for example, a semitransparent gold contact. Another type of backside contact can employ a conducting mesh as the contact. One example of a conducting mesh would be a network of interconnected segments of metal 42 that may or may not display a fixed periodicity. The dimensions (both length and width) of the metal line segments of the mesh are selected to provide suitable electrical connection while not excessively impeding light transmission through the substrate (FIG. 13b). Either an n-type or a p-type semiconductor may be employed. Additionally, the applied bias may be of the same polarity as the free carrier to form a depletion layer (for example, negative for n-type) or of the opposite polarity (for example, positive for n-type) to form an accumulation layer within the evanescent wave penetration depth.

Figure 14:
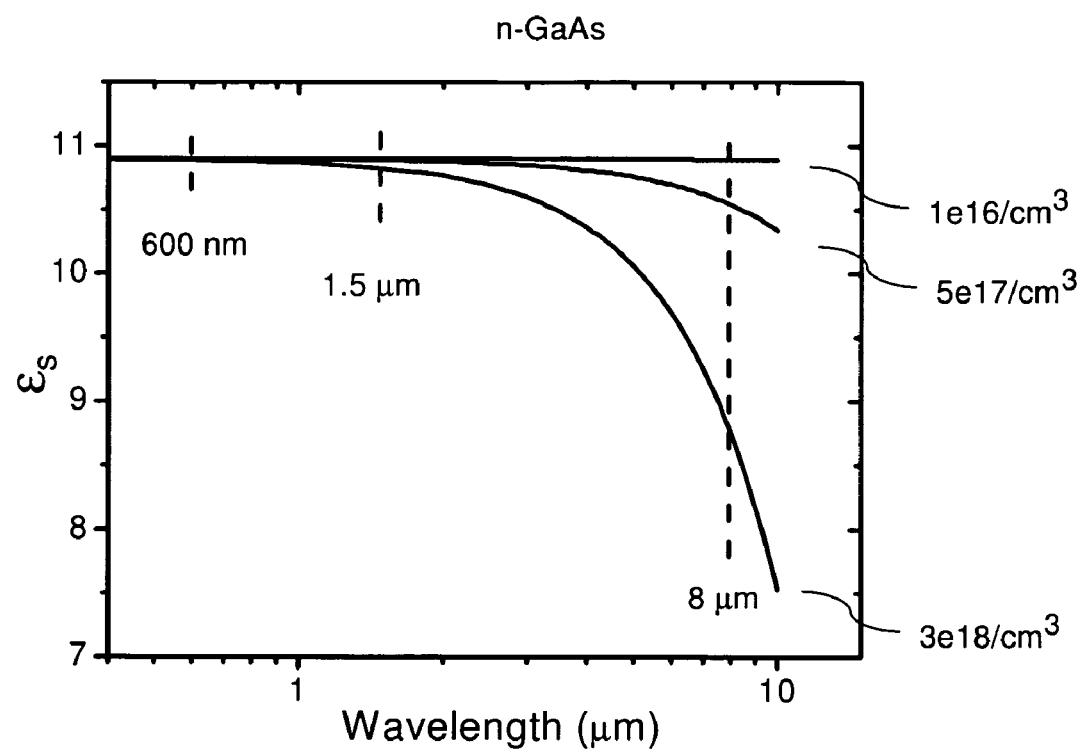
FIG. 14 illustrates the doping-level dependence of the dielectric constants of GaAs versus wavelength.

FIG. 14 illustrates for GaAs the dependence of the dielectric constant on n-type free-carrier concentration as a function of wavelength. Application of a depleting voltage to the gate (grating) may be used to reduce the free-carrier concentration, thereby changing the dielectric constant and shifting the SP resonance wavelength.

Figure 15:
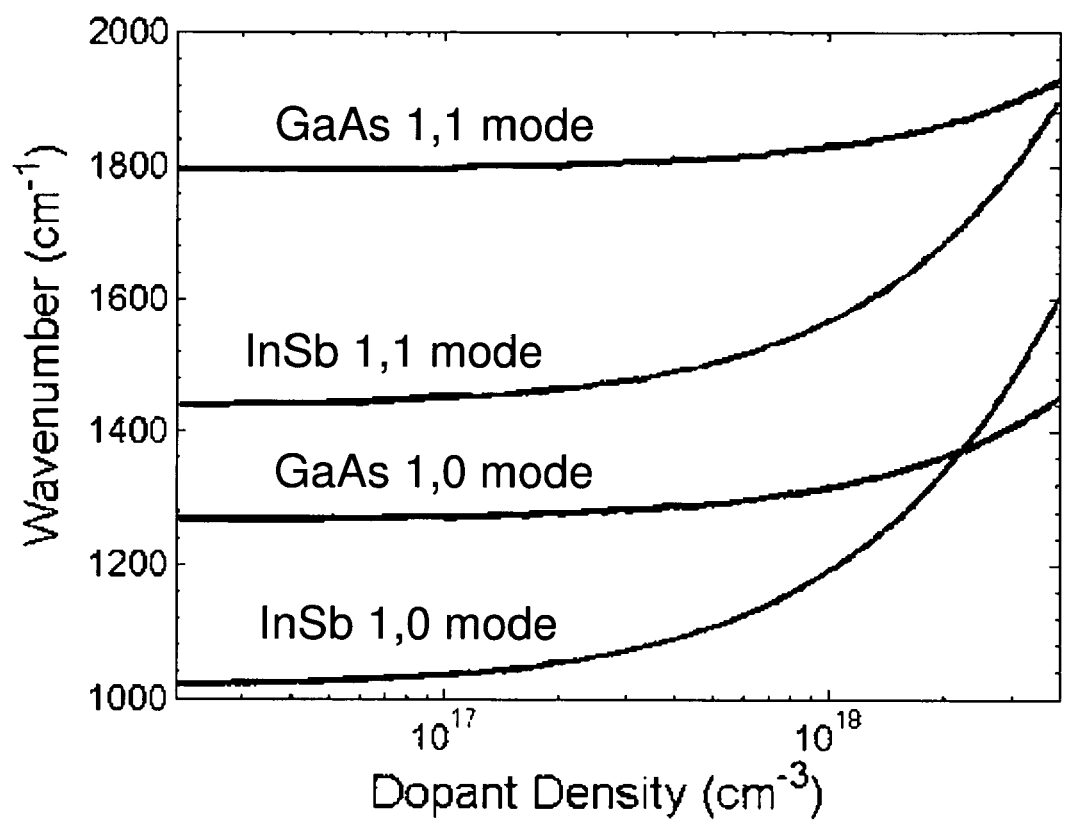
FIG. 15 illustrates the calculated frequency vs. doping density of a 2.4 micron period Gold mesh on GaAs and InSb.

FIG. 15 presents the calculated doping dependence of the resonance wavelength for the (1,0) and (1,1) plasmon modes for GaAs and InSb with a grating of 2.4 micron periodicity. This illustrates the differences in SP resonance frequencies for different semiconductors and the differing amounts of doping level sensitivity for these two semiconductors with the same grating periodicity; smaller changes in doping level correspond to larger changes in the resonance wavelength for InSb-based devices than for GaAs-based devices.

Figure 16:
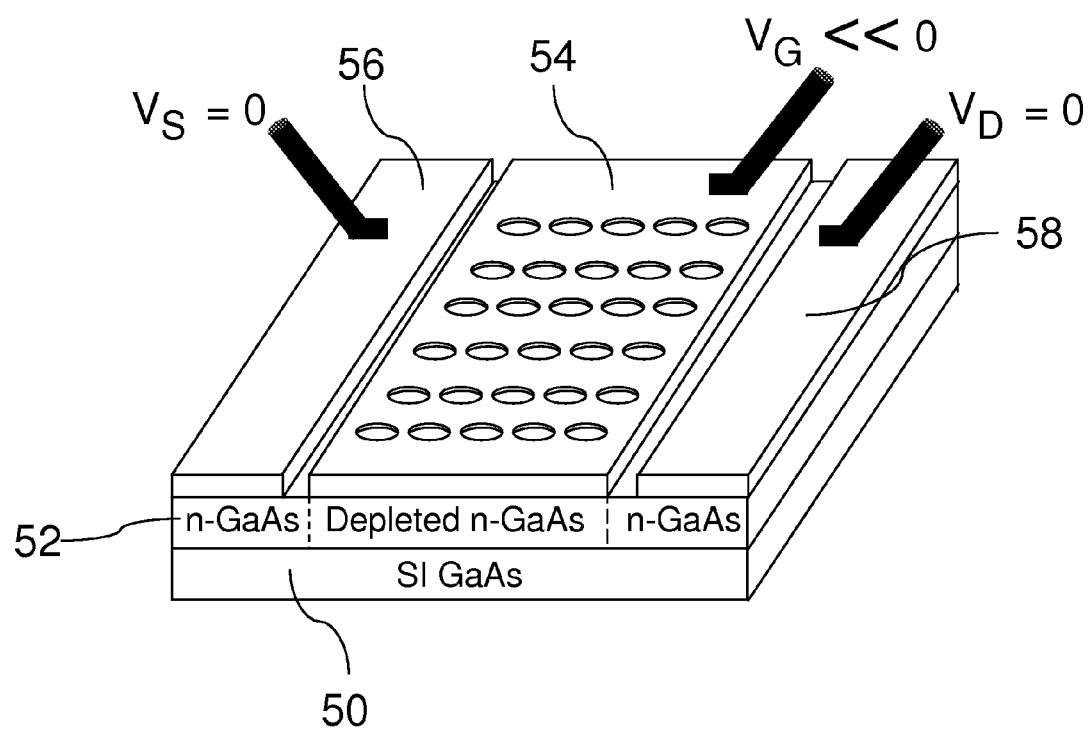
FIG. 16 illustrates a tilted cross-section of a gating-tuned EOT grating device based on a MESFET-like design. The number of apertures in the illustration is not intended to be representative of the total number of apertures in the grating device.

Another embodiment that employs the grating as a gate is illustrated in FIG. 16 where the EOT grating is incorporated as the gate in a MESFET-like structure comprising GaAs; other semiconductor materials may also be used. (MESFET=metal-semiconductor field effect transistor) The device may be either an n-type or a p-type device. In the embodiment in FIG. 16, an epitaxial layer of n-type GaAs 52 is grown on a semi-insulating or lightly doped substrate 50. The EOT grating 54 is also employed as the gate electrode. Ohmic contacts 56 and 58 are formed on the surface; during device operation these contacts may be at the same potential, as illustrated in FIG. 16, or they may be at different potentials. Application of a negative bias voltage to the EOT gate depletes the free carriers beneath the gate (EOT grating), changing the dielectric constant and shifting the SP resonance wavelength. If the device in FIG. 16 is operated such that current flows during application of the gating voltage to the EOT grating, the change in dielectric constant under the grating may be the combined result of thermal effects and voltage-induced depletion. If no gating voltage is applied, the device operates like the thermal device in FIG. 1. Thus, the MESFET-like device illustrated in FIG. 16 has several modes of operation.

Figure 17A:
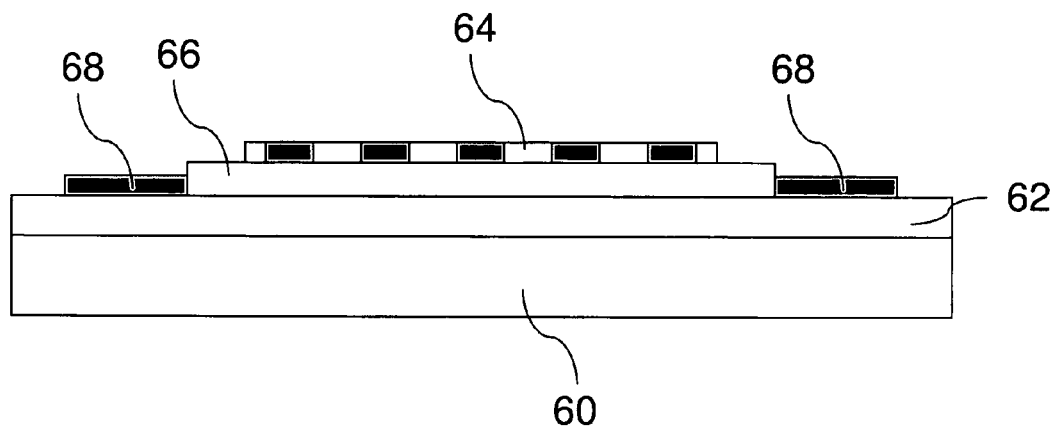
FIG. 17 illustrates a cross section of a gating tuned EOT grating device that includes a thin insulator layer between the EOT grating gate and the doped semiconductor layer. The number of apertures in the illustration is not intended to be representative of the total number of apertures in the grating device. The insulator and Ohmic contact metal may be positioned a) without or b) with an exposed surface of the doped semiconductor layer between them.
Figure 17B:
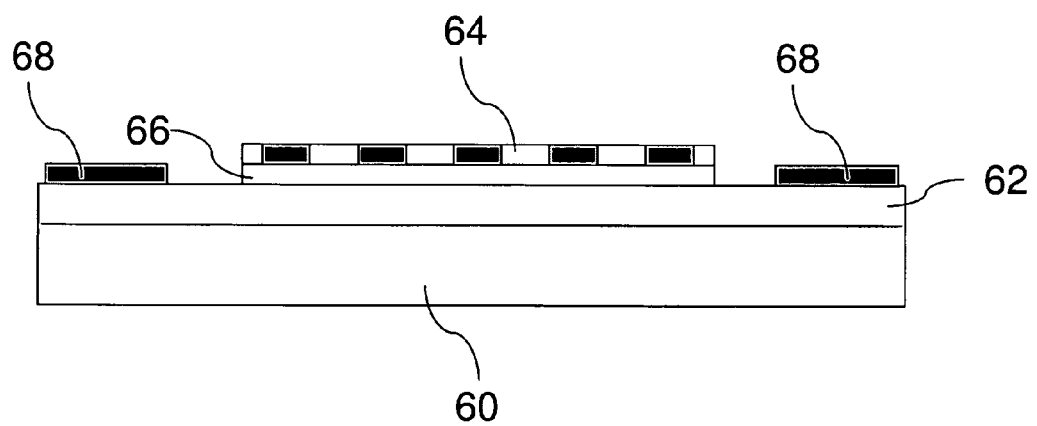

FIG. 17 illustrates, in cross-section, embodiments where an insulator layer 66 is inserted between the EOT grating gate and the doped semiconductor layer. The inclusion of an insulating layer minimizes the possibility of a thermal heating contribution to the change in the dielectric constant of the semiconductor layer that may result when there is appreciable leakage current between the gate and the Ohmic contacts 68 under applied bias. A doped semiconductor layer 62 is grown on a substrate 60. The doping may be n-type or p-type; the doping type (polarity) determines the polarity of the applied voltage that may be used as the gating voltage that is applied to the EOT grating gate 64 to produce free-carrier depletion in the doped semiconductor layer beneath the gate, thereby altering the semiconductor dielectric constant. To deplete the region under the gate 64, voltage of the same polarity as the doping type is applied. The insulator and Ohmic contact metal may be positioned without (as in FIG. 17a) or with (as in FIG. 17b) an exposed surface of the doped semiconductor layer between them. An alternative method of operation is to apply a voltage of the opposite polarity as the doping type, for example, a positive voltage when the doped semiconductor is n-type. This will cause accumulation of the dominant carrier type in the region under the EOT grating gate, which will also alter the dielectric constant and cause a shift in the SP passband.

Figure 18:
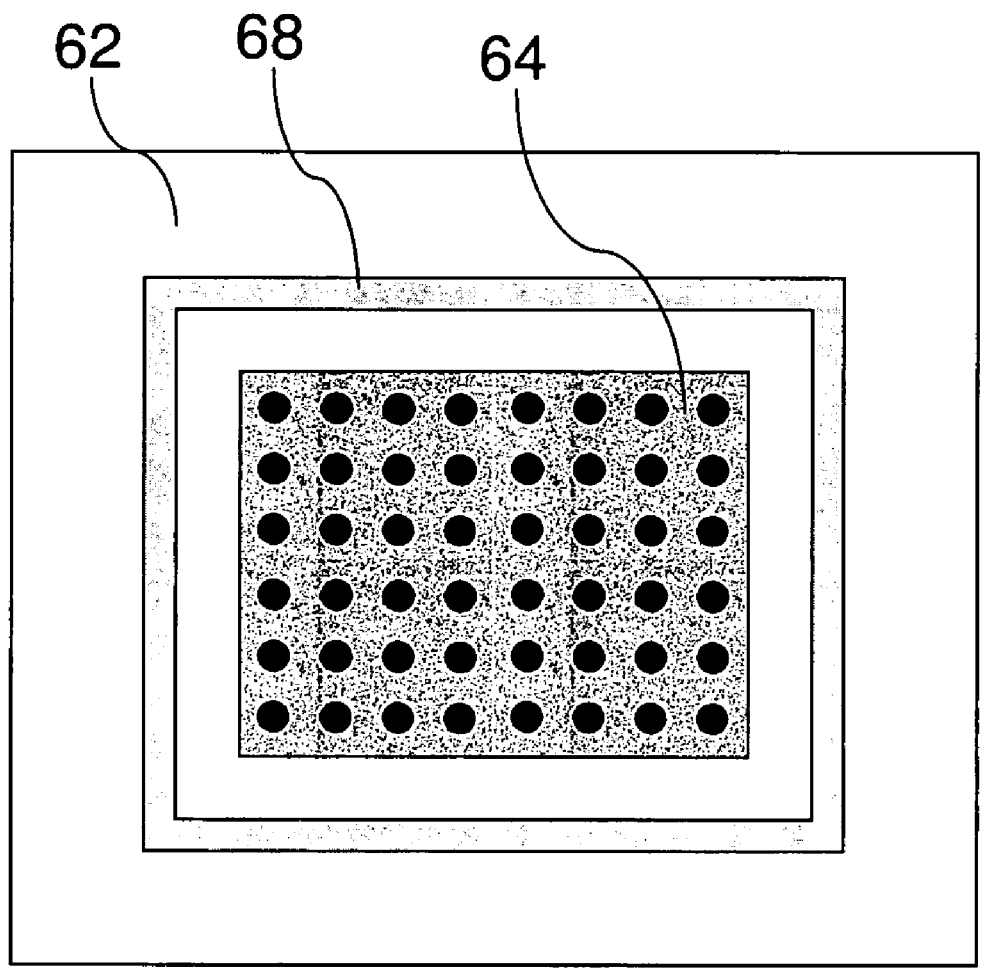
FIG. 18 illustrates a top view of an embodiment of a gating tuned EOT grating device. The number of apertures in the illustration is not intended to be representative of the total number of apertures in the grating device.

FIG. 18 presents a top-view of a grating-gated device illustrating an alternative arrangement of the EOT grating gate and the Ohmic contact. In FIG. 16, the Ohmic contacts 56 and 58 are shown to run approximately parallel to two opposite sides of the grating array 54. FIG. 18 illustrates an embodiment in which the grating gate 64 is circumscribed by the Ohmic contact 68. A wide variety of geometric shapes of the EOT grating may employed in embodiments of this invention; a rectangular array is presented in FIG. 18, but other array shapes with linear or curved edge geometries, including, for example, circular, may be employed. For example, the shapes and relative arrangement of the grating gate and the Ohmic contact may be selected so as to enhance the uniformity of the dielectric constant of the depleted region of semiconductor under the EOT grating.

Figure 19:
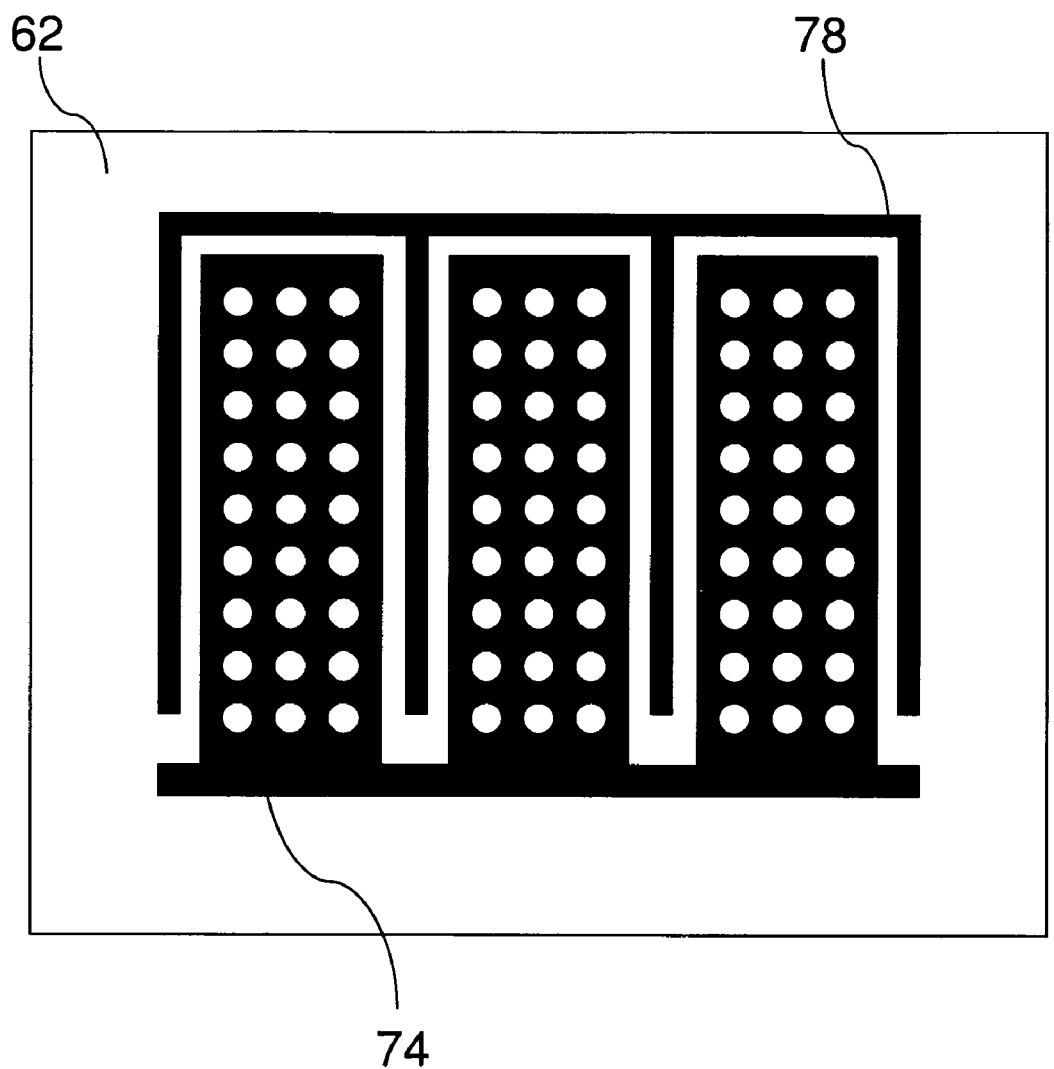
FIG. 19 illustrates a top view of an embodiment of a grating tuned EOT grating device where the grating gate and the Ohmic contact lines are interdigitated. The number of apertures in the illustration is not intended to be representative of the total number of apertures in the grating device.

FIG. 19 presents a top-view of an embodiment of a grating-gate device of the type illustrated in FIG. 16 with another alternative arrangement of the EOT grating gate and the Ohmic contact. The grating gate FIG. 19 illustrates an embodiment in which a grating gate 74 comprising several sections of EOT grating are interdigitated by the Ohmic contact 78. Additional arrangements of the grating and the Ohmic contacts may also be employed in embodiments of this invention. For example, other arrangements, such as a hexagonal lattice, that can support surface plasmon excitation can be implemented.

Figure 20:
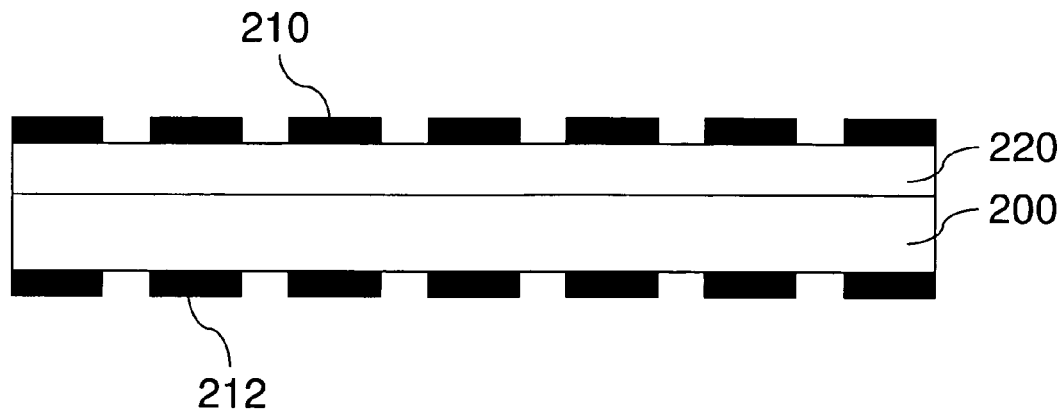
FIG. 20 illustrates a cross section of an embodiment where two EOT gratings are formed on the top and bottom surfaces of a substrate to form a gate and an Ohmic contact

FIG. 20 illustrates an embodiment where two EOT gratings 210 and 212 are formed on the top and bottom surfaces of a substrate 200 to form a gate and an Ohmic contact. The substrate is suitably doped within the evanescent-field distance from the gratings to permit desired voltage-induced changes in the doping levels under applied bias. There does not have to be a uniform doping density across the vertical dimension of the substrate; spatial differences in doping level are possible, depending on the intended mode of operation of the device. Optionally a spacer 220 may be located between the EOT grating 210 and the substrate 200. To operate as a modulator, the top and bottom gratings would be brought into or out of resonance with each other through application of a voltage bias. When both are at the same resonance frequency, the structure would operate as a double bandpass filter. By tuning one EOT mesh out of resonance, light would transmit through one EOT mesh, and be blocked/reflected by the other. The device can also be operated in such a way that, initially, the meshes are out of resonance, and they are brought into resonance through application of the bias.

Figure 21:
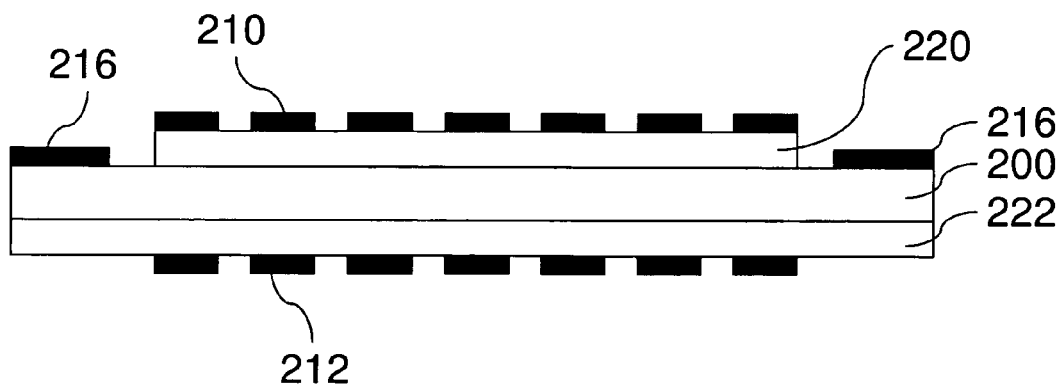
FIG. 21 illustrates a cross section of an embodiment where two EOT gratings are formed on the top and bottom surfaces of a substrate to form a gate and an Ohmic contact and wherein additional Ohmic contacts are located outside the grating region such that they do not substantially overlay the grating region.

FIG. 21 illustrates an embodiment similar to that in FIG. 20 but wherein additional Ohmic contacts 216 are placed outside the grating region 210 and a second optional spacer layer 222 is located between the substrate 200 and the backside EOT grating 212.

Figure 22:
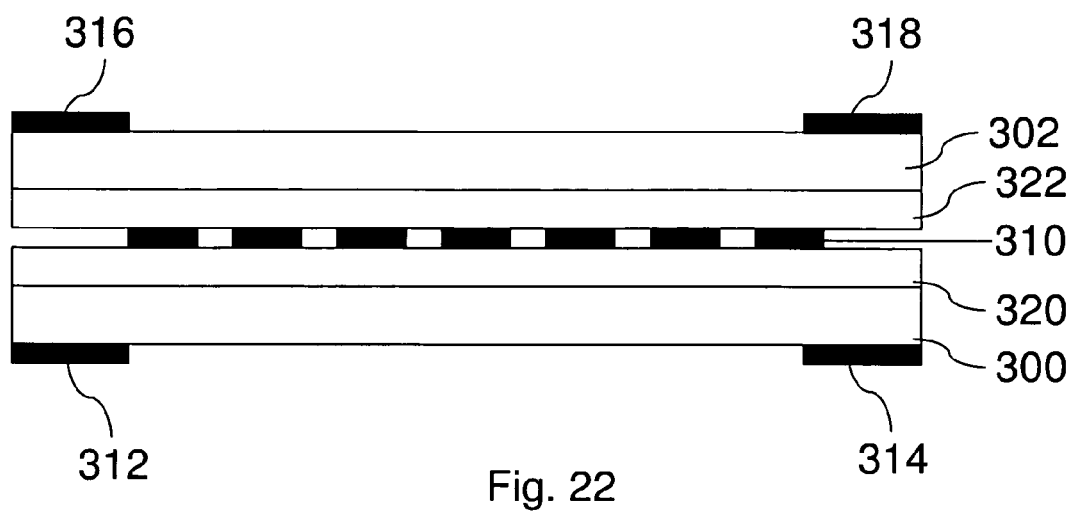
FIG. 22 illustrates a cross section of a device with a sandwich structure where the structure above and below the EOT grating is approximately symmetric and Ohmic contacts are located outside the grating region such that they do not substantially overlay the grating region.

FIG. 22 illustrates a cross section of a device where the structure above and below the EOT grating is approximately symmetric. The SP modes at a metal/air and a metal/semiconductor interface are at different frequencies. Making the device approximately symmetric places SPs at both sides of the EOT grating 310 at approximately the same resonance frequency. This leads to enhanced performance in terms of higher transmission and in terms of suppressing unwanted surface plasmon transmission due to air/metal resonances. The semiconductor layers 300 and 302 can comprise the same materials and layer structures or different ones, as with layer 9 in FIG. 1b. Layers 320 and 322 are optional spacer layers, as in FIG. 1b, and are configured such that the dielectric-tuned regions of layers 300 and 302 are within the evanescent-field distance from the EOT grating 310. Ohmic contacts 312, 314, 316, and 318 are for connection to one or more current supplies for resistive heating of the structure to tune the SP frequencies.

Figure 23:
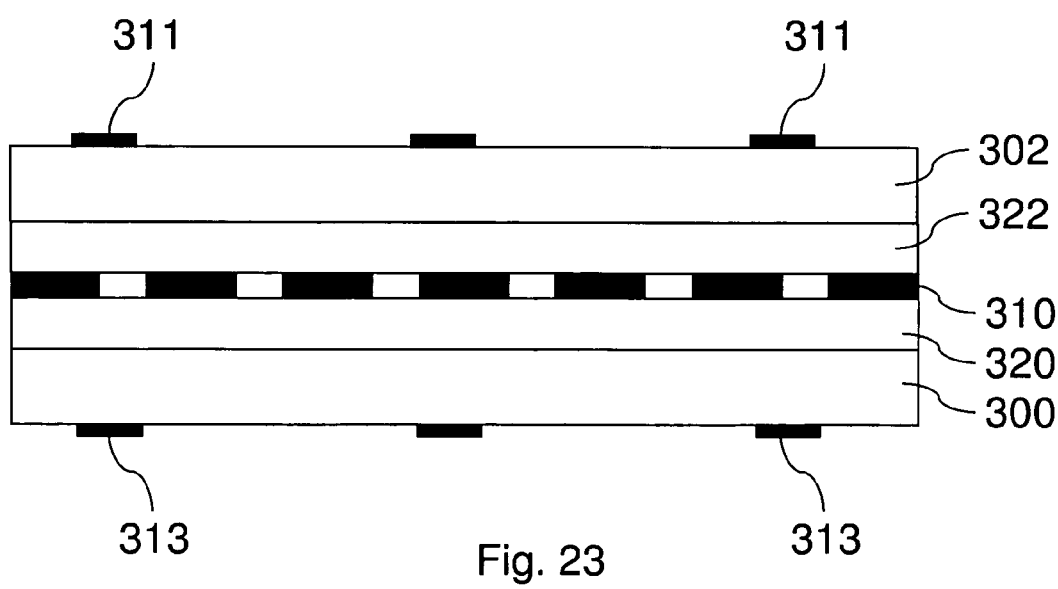
FIG. 23 illustrates a cross section of a device with a sandwich structure where the structure above and below the EOT grating is asymmetric or approximately symmetric and Ohmic contact lines or an Ohmic contact mesh overlays the grating region.

FIG. 23 is cross section view of a variation on the device embodiments in FIG. 22 where the Ohmic contacts not overlaying the EOT grating zone are replaced by Ohmic lines 311 and 313 or an Ohmic mesh 311 and 313 that overlays the EOT grating region. Another variation not illustrated has a transparent or semitransparent electrode formed overlying the EOT grating region. Assorted combinations of Ohmic contact configurations may be used, where the contact configuration providing current to layer 300 may or may not be the same as the contact configuration providing current to layer 302.

Figure 24:
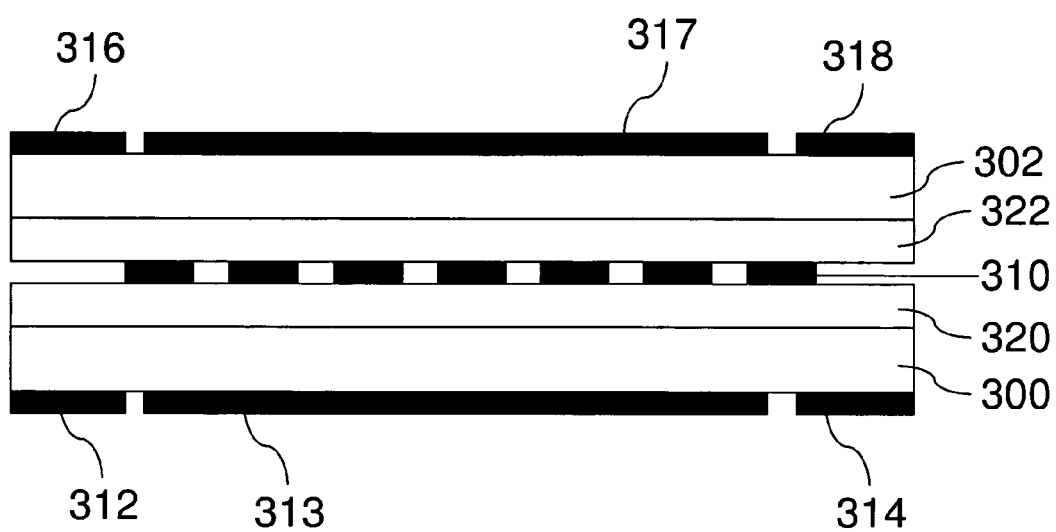
FIG. 24 illustrates a cross section of a device with a sandwich structure where the structure above and below the EOT grating is approximately symmetric, Ohmic contacts are located outside the grating region such that they do not substantially overlay the grating region, and one or two transparent or semi-transparent electrodes overlay the grating region.

FIG. 24 illustrates a device similar to FIG. 22 with one or two additional transparent or semi-transparent contacts 313 and 317 overlaying the EOT region, thereby allowing the employment of a variety of contact configurations during operation. It also allows for resistive heating or gated operation in a single device.

For sandwich-type structures, such as illustrated in FIGS. 22-24, in some embodiments different semiconductor materials may be used for the semiconductor materials above and below the grating.

While the preceding embodiments employing gated adjustment of carrier concentration are discussed primarily in terms of their operation in a depletion mode, it is also possible to operate such devices in an accumulation mode by applying a gating voltage to the EOT grating gate of the opposite polarity to that of the doped semiconductor layer. In general, it will be possible to achieve larger effects in depletion mode than in accumulation mode.

The preceding embodiments represent versions of this invention where application of a voltage is used to adjust the passband of an EOT grating without having to change the gross periodicity or aperture size and shape of the grating. This tunability allows the fabrication of devices that operate at a precisely tuned passband even when some variation in the periodicity and aperture dimensions occurs due to variability in the grating fabrication process. Additionally, embodiments of this invention make possible the ready and inexpensive formation of passive passband filters operating at different wavelengths while using the same periodicity and aperture characteristics for the EOT. Since every change in periodicity requires a different photolithographic mask, it is very expensive and inconvenient to change the passband frequency by changing periodicity. The ability to select a passband without changing the mask set is a highly desirable aspect of many embodiments of this invention. Since the dielectric constant of the semiconductor proximate to the EOT grating depends on the semiconductor doping level, a wide range of passband frequencies are accessible with the same EOT grating design if one grows a doped semiconductor layer where the doping level is selected to provide the proper dielectric constant to produce the desired passband wavelength. Selection of the semiconductor material selects the gross value of the dielectric constant and associated passband wavelength range for a given EOT grating periodicity while selection of the proper doping level of the proximate semiconductor layer tunes the passband to the specific desired wavelength within that range. These embodiments of the invention may be operated without the application of a voltage.

Some embodiments were made using the GaAs/AlGaAs semiconductor system. Other embodiments may use different semiconductors. Selection of the semiconductor for a particular embodiment is based on several criteria. The substrate should be transparent or at least partially transparent at the SP resonance frequency. For some wavelengths, free-carrier absorption may reduce the transparency. Free-carrier effects can be avoided by using insulating, semi-insulating, or slightly doped semiconductor substrates. A wide variety of semiconductor systems may be used as long as adequate transparency is provided. These include but are not restricted to Si, Ge, InP, InAs, InSb, GaN, GaP, GaAs, GaSb, CdSe, CdTe, ZnO, and ZnS. Appropriate grating periodicity and aperture size may be determined for a desired wavelength with a particular semiconductor using Eqn. 1.

In some embodiments, a fixed transmission wavelength may be the desired operational end. In such cases, the carrier concentration that provides the tunability of the bandpass wavelength may be controlled essentially by the selection of the doping level in the interfacial region for the specific semiconductor structure employed. In such embodiments, the general position of the SP resonance wavelength is governed by the EOT grating periodicity, the metal, and the selection of a semiconductor material that provides a dielectric constant in the semi-insulating limit that approximately provides the proper SP resonance wavelength. Additionally, the semiconductor is chosen to be transparent or at least semitransparent at the SP resonance (transmission) wavelength. For a given EOT grating periodicity, tuning of the SP passband frequency is obtained by placing a controllably doped semiconductor layer proximate to the EOT grating such that the doping level of the semiconductor material within the evanescent-field distance from the EOT grating provides a dielectric constant value that produces the desired bandpass wavelength. This may be achieved by growing a layer of semiconductor of the desired doping level within the evanescent-field distance. For some wavelengths, the doping level of the substrate semiconductor may be proper for achieving the desired bandpass wavelength. In such cases, the controllably doped semiconductor layer may be the upper region of the substrate that is within the evanescent-field distance.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A tunable optical filter, comprising:
   a substrate, the substrate having a front side and a back side and being transparent at a light transmission wavelength;
   a doped region of the substrate, wherein the doped region has a doping level suitable for resistive heating by passage of a current;
   a metallic extraordinary optical transmission grating located proximate the front side of the substrate and having a periodic array of apertures therethrough, the apertures each having a maximum cross-sectional dimension less than the light transmission wavelength and a periodic spacing corresponding to approximately resonance with the light transmission wavelength;
   a dielectric layer within an evanescent-field distance of the extraordinary optical transmission grating and with a temperature-dependent dielectric constant, the dielectric layer being situated for heating as a consequence of the passage of the current through the doped region of the substrate, whereby the periodic array of apertures and the temperature-dependent dielectric constant produce a tuned surface plasmon passband at approximately the light transmission wavelength; and
   at least one contact in electrical contact with the doped region.

2. The tunable optical filter of claim 1, wherein the dielectric layer comprises a portion of the doped region of the substrate.

3. The tunable optical filter of claim 2, wherein the extraordinary optical transmission grating is in electrical contact with the doped region.

4. The tunable optical filter of claim 3, wherein the at least one contact is on the back side of the substrate.

5. The tunable optical filter of claim 4, wherein the at least one contact is selected from the group consisting of a semitransparent film contact, a plurality of lines, a mesh, and a second extraordinary optical transmission grating.

6. The tunable optical filter of claim 2, further comprising a second contact in electrical contact with the doped region and wherein the extraordinary optical transmission grating is optionally electrically isolated from the doped region by a spacer layer.

7. The tunable optical filter of claim 6, further comprising a second contact on the back side of the substrate and in electrical contact with the doped region.

8. The tunable optical filter of claim 7, further comprising:
   a second substrate having a second front side and a second back side, wherein the second front side is proximate to the extraordinary optical transmission grating and wherein the second substrate is transparent at the light transmission wavelength;
   a third contact and a fourth contact, both in electrical contact with a second doped region of the second substrate, wherein the second doped region has a doping level suitable for resistive heating by passage of current; and
   optionally a second spacer layer between the extraordinary optical transmission grating and the second substrate.

9. The tunable optical filter of claim 6, further comprising a second extraordinary optical grating located on the back side of the substrate and optionally electrically isolated from the doped region by a second spacer layer.

10. The tunable optical filter of claim 1, further comprising a second contact in electrical contact with the doped region.

11. The tunable optical filter of claim 10, wherein the at least one contact and the second contact are on the front side of the substrate.

12. The tunable optical filter of claim 11, further comprising a second extraordinary optical transmission grating on the back side of the substrate.

13. The tunable optical filter of claim 1, wherein the substrate comprises a semiconductor selected from the group consisting of Si, Ge, GaN, GaP, GaAs, GaSb, InP, InAs, InSb, CdSe, CdTe, ZnO, and ZnS.

14. The tunable optical filter of claim 1, wherein the doped region is an n-type doped semiconductor.

15. The tunable optical filter of claim 14, wherein the doped region is gallium arsenide with an n-type doping level between approximately $1 \times 10^{16}/cm^3$ and approximately $1 \times 10^{19}/cm^3$.

16. The tunable optical filter of claim 14, wherein the doped region is indium antimonide with an n-type doping level between approximately $1 \times 10^{16}/cm^3$ and approximately $1 \times 10^{19}/cm^3$.

17. The tunable optical filter of claim 1, wherein the extraordinary optical transmission grating is a metal layer, the metal being selected from the group consisting of Cu, Ag, Au, Ni, Pt, Pd, Cr, Mo, W, Ti, Al, In, and their alloys.

* * * * *